United States Patent
Sharma et al.

(10) Patent No.: US 12,452,159 B2
(45) Date of Patent: Oct. 21, 2025

(54) ADVERTISEMENT OF SELECTIVE EVPN ROUTES BASED ON ROUTE TYPES

(71) Applicant: Ciena Corporation, Hanover, MD (US)

(72) Inventors: Piyush Sharma, Gurgaon (IN); Param Preet Singh Dhillon, Sri Ganganagar (IN); Varun Munjal, Gurgaon (IN); Anil Dharmshaktu, New Delhi (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/488,211

(22) Filed: Oct. 17, 2023

(65) Prior Publication Data

US 2025/0080452 A1 Mar. 6, 2025

(30) Foreign Application Priority Data

Sep. 1, 2023 (IN) .............................. 202311058643

(51) Int. Cl.
*H04L 45/02* (2022.01)
*H04L 45/033* (2022.01)

(52) U.S. Cl.
CPC ............ *H04L 45/04* (2013.01); *H04L 45/033* (2022.05)

(58) Field of Classification Search
CPC .................. H04L 45/00–851; H04L 45/02–04
See application file for complete search history.

(56) References Cited

U.S. PATENT DOCUMENTS

| | | | |
|---|---|---|---|
| 9,237,090 B2 | 1/2016 | Tripathi et al. | |
| 9,491,092 B1* | 11/2016 | Bickhart | H04L 45/22 |
| 9,538,573 B2 | 1/2017 | Khan et al. | |
| 9,774,504 B2* | 9/2017 | Utgikar | H04L 45/033 |
| 10,158,448 B2 | 12/2018 | Prakash et al. | |
| 10,862,797 B2 | 12/2020 | Gautam et al. | |
| 11,283,711 B2* | 3/2022 | T | H04L 45/023 |
| 11,575,541 B1* | 2/2023 | Styszynski | H04L 12/4633 |
| 2015/0304159 A1 | 10/2015 | Sharma et al. | |
| 2017/0093641 A1* | 3/2017 | Utgikar | H04L 45/02 |
| 2018/0076976 A1 | 3/2018 | Chhabra et al. | |
| 2018/0287946 A1* | 10/2018 | Nagarajan | H04L 12/1877 |
| 2018/0375763 A1* | 12/2018 | Brissette | H04L 67/63 |
| 2019/0379596 A1 | 12/2019 | Sharma et al. | |

(Continued)

OTHER PUBLICATIONS

K. Patel et al., "Extension to BGP's Route Refresh Message," Network Working Group, Internet-Draft, Standards Track, Aug. 29, 2018, 15 pages.

(Continued)

*Primary Examiner* — Brendan Y Higa
(74) *Attorney, Agent, or Firm* — Baratta Law PLLC; Lawrence A. Baratta, Jr.

(57) ABSTRACT

A router is configured to send an advertisement of selective Ethernet Virtual Private Network (VPN) (EVPN) routes based on the Route Types. The router is configured to determine a requirement for a route refresh from a Border Gateway Protocol (BGP) peer for a subset of Route Types of all of the Route Types, send a route refresh message to the BGP peer with an indication of the subset of Route Types, and receive updated routes from the BGP peer only for the subset of Route Types. The indication can be included in a reserved field and payload of the route refresh message. The route refresh message can be defined in RFC 2918.

17 Claims, 3 Drawing Sheets

(56) References Cited

U.S. PATENT DOCUMENTS

2023/0120019 A1    4/2023  Shah et al.
2024/0056390 A1*   2/2024  Devaraj ............. H04L 12/4641

OTHER PUBLICATIONS

A. Utgikar, "Selective route refresh for BGP," Internet Engineering Task Force, Internet-Draft, Standards Track, Nov. 7, 2015, 9 pages.
Jan. 9, 2025, European Search Report for European Patent Application No. EP 24 19 7730.

* cited by examiner

```
Type. 5 - ROUTE-REFRESH

Message Format: One <AFI, SAFI> encoded as 0        7       15       23       31
     +--------+--------+--------+--------+
     |     AFI         | Res.   | SAFI   |
     +--------+--------+--------+--------+

The meaning, use and encoding of this <AFI, SAFI> field is the
same as defined in [BGP-MP, sect. 7]. More specifically, AFI  - Address Family Identifier (16 bit).

Res. - Reserved (8 bit) field. Should be set to 0 by the
           sender and ignored by the receiver.

SAFI   Subsequent Address Family Identifier (8 bit).
```

ADVERTISEMENT OF SELECTIVE EVPN ROUTES BASED ON ROUTE TYPES

FIELD OF THE DISCLOSURE

The present disclosure relates generally to networking and computing. More particularly, the present disclosure relates to systems and methods for advertisement of selective Ethernet Virtual Private Network (VPN) (EVPN) routes based on Route Types.

BACKGROUND OF THE DISCLOSURE

Ethernet Virtual Private Network (VPN) (EVPN) is an approach to provide virtual multipoint bridged connectivity between different Layer 2 domains. EVPN is considered an improvement over Layer 2 Virtual Private Local Area Network (LAN) service (VPLS) with control plane Media Access Control (MAC) learning, multi-homing, load balancing, and the like. EVPN control plane MAC learning, via Border Gateway Protocol (BGP), is used to address shortcomings in VPLS. EVPN is described, e.g., in RFC 7209, "Requirements for Ethernet VPN (EVPN)," May 2014, RFC 7432, "BGP MPLS-Based Ethernet VPN," February 2015, and RFC 8365, "A Network Virtualization Overlay Solution Using Ethernet VPN (EVPN)," March 2018, the contents of each are incorporated by reference. EVPN uses Border Gateway Protocol (BGP) signaling to establish the EVPN instance (EVI) with BGP Peers to offer a multipoint-to-multipoint L2 Ethernet service for a given client. EVPN relies on learning the Internet Protocol (IP) and Media Access Control (MAC) address binding of the locally connected Customer Edges (CEs) and distributing this information in the BGP EVPN Protocol Data Units (PDUs) to remote Provider Edges (PEs) that are members of the established EVPN instance. BGP utilizes an EVPN Network Layer Reachability Information (NLRI), which includes a Route Type field that details the encoding of the EVPN NLRI. The Route Types include 1—Ethernet Auto-Discovery (A-D) route, 2—MAC/IP Advertisement route, 3—Inclusive Multicast Ethernet Tag route, 4—Ethernet Segment route, 5—IP prefix route, 6—selective Multicast Ethernet Tag route, 7—NLRI to sync IGMP joins, and 8—NLRI to sync IGMP leaves.

BRIEF SUMMARY OF THE DISCLOSURE

The present disclosure relates to systems and methods for advertisement of selective Ethernet Virtual Private Network (VPN) (EVPN) routes based on route types (RT). Conventionally, when a BGP peer sends a normal BGP route refresh message for a L2VPN EVPN results in the advertisement of a complete BGP routing information base (RIB), while there can be cases where there is only a requirement for selective route types. The present disclosure proposes a new mechanism where a BGP node can request the advertisement of selective EVPN routes based on route types. This solution defines a new route refresh message containing the EVPN route type information, with a new route refresh capability where BGP speakers can negotiate to enable each of them to encode and decode this new route refresh message. With this new mechanism, the BGP receiver processes this new route refresh message containing the EVPN route type info and advertises the selective EVPN routes from the BGP RIB based on the EVPN route types requested.

In an embodiment, a router is configured to send an advertisement of selective Ethernet Virtual Private Network (VPN) (EVPN) routes based on Route Types. The router includes circuitry configured to determine a requirement for a route refresh from a Border Gateway Protocol (BGP) peer for a subset of Route Types of all of the Route Types, send a route refresh message to the BGP peer with an indication of the subset of Route Types, and receive updated routes from the BGP peer only for the subset of Route Types. The circuitry can be further configured to determine a second requirement for a route refresh from the BGP for all of the Route Types, send a second route refresh message to the BGP peer without the indication of the subset of Route Types, and receive second updated routes from the BGP peer for all of the Route Types. The indication can be included in one or more of a reserved field and payload of the route refresh message. Responsive to the BGP peer not supporting the indication of the subset of Route Types, the circuitry can be further configured to negotiate the received updated routes are for the all of Route Types. Bits in the payload can be used to designate one or more Route Types for the subset of Route Types based on the reserved field. A value in the payload can be used to designate one or more Route Types for the subset of Route Types. The route refresh message can be defined in RFC 2918. The subset of Route Types can include one of Route Types 1 to 4 or Route Type 5. The circuitry can be further configured to, prior to the route refresh message being sent, negotiate with the BGP peer to support the route refresh message with the indication of the subset of Route Types.

In another embodiment, a method includes steps and a non-transitory computer-readable medium includes instructions that, when executed, cause circuitry associated with a router to perform the steps. The steps include determining a requirement for a route refresh from a Border Gateway Protocol (BGP) peer for a subset of Route Types of all of the Route Types; sending a route refresh message to the BGP peer with an indication of the subset of Route Types; and receive updated routes from the BGP peer only for the subset of Route Types. The indication can be included in one or more of a reserved field and payload of the route refresh message. The subset of Route Types can include one of Route Types 1 to 4 or Route Type 5. The steps can further include, prior to the sending, negotiating with the BGP peer to support the route refresh message with the indication of the subset of Route Types.

In a further embodiment, a router is configured to receive selective Ethernet Virtual Private Network (VPN) (EVPN) routes based on Route Types. The router includes circuitry configured to receive a route refresh message from a Border Gateway Protocol (BGP) peer, wherein the route refresh message includes an indication of a subset of Route Types of all of the Route Types, obtain updated routes for the subset of Route Types as specified in the indication, and send the updated routes only for the subset of Route Types to the BGP peer. The indication can be included in one or more of a reserved field and payload of the route refresh message. Bits in the payload can be used to designate one or more Route Types for the subset of Route Types based on the reserved field. A value in the payload can be used to designate one or more Route Types for the subset of Route Types. The route refresh message can be defined in RFC 2918. The subset of Route Types can include one of Route Types 1 to 4 or Route Type 5. The circuitry can be further configured to, prior to the route refresh message being received, negotiate with the BGP peer to support the route refresh message with the indication of the subset of Route Types.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for advertisement of selective Ethernet Virtual Private Network (VPN) (EVPN) routes based on route types (RT). The following table lists acronyms used herein.

| | |
|---|---|
| AF | Address Family |
| AFI | Address Family Identifier |
| BGP | Border Gateway Protocol |
| DCI | Data Center Interconnect |
| DUT | Device Under Testing |
| ESI | Ethernet segment identifier |
| EVI | EVPN Instance |
| EVPN | Ethernet Virtual Private Network |
| IGMP | Internet Group Management Protocol |
| IP | Internet Protocol |
| LAN | Local Area Network |
| L2VPN | Layer 2 Virtual Private Network |
| L3VPN | Layer 3 Virtual Private Network |
| MAC | Media Access Control |
| NLRI | Network Layer reachability information |
| PE | Provider Edge |
| RR | Route Refresh |
| RT | Route Type |
| SAFI | Subsequent Address Family Identifier |
| VLAN | Virtual Local Area Network |
| VXLAN | Virtual Extensible LAN |

Network

Figures 1, 2:
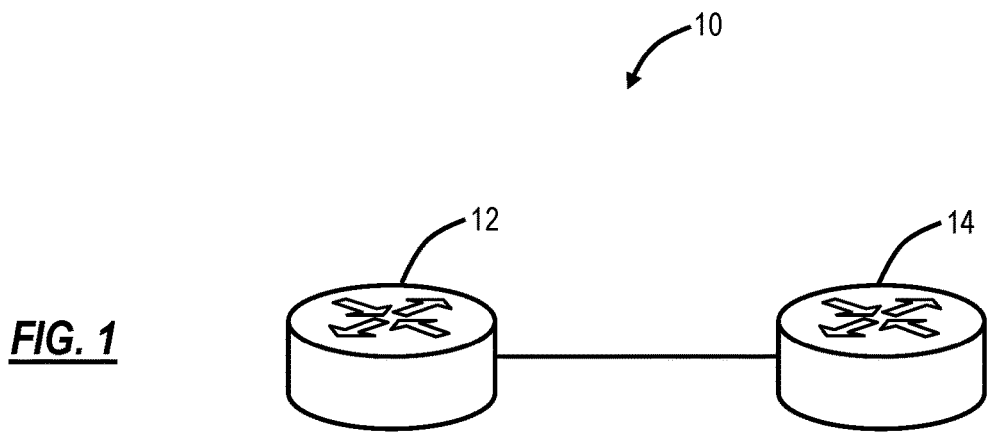
FIG. 1 is a network diagram of a network with two interconnected routers.
FIG. 2 is a diagram of a RR message as defined in RFC 2918.

For illustration purposes, FIG. 1 is a network diagram of a network 10 with two interconnected routers 12, 14. The routers 12, 14 are BGP peers to one another and configured to implement L2VPN EVPN. Those skilled in the art will understand the network 10 can include other network elements that are omitted for simplicity.

L2VPN EVPN and Problem Description

BGP is used between the routers 12, 14 to share routing information with one another. Multi-Protocol BGP (MP-BGP) is an extension of BGP that allows it to carry additional information about multiple protocols including IPv4, IPv6, NHRP, VPNv4, VPNv6 and others. AFI and SAFI are extensions in MP-BGP. Address Family Indicator (AFI) and Subsequent Address Family Indicator (SAFI) are fields within Multi-Protocol BGP (MP-BGP) extensions. The information in these fields is sent as part of the neighbor capability exchange during the process of becoming BGP peers. The information in these fields is used to tell the remote peer what address family (IPv4, IPv6, VPNv4, VPNv6 etc.) and what specific sub-address family (multicast or unicast) the local BGP router will be transporting routes for.

L2VPN EVPN utilizes BGP AFI and SAFI to support an end-to-end solution for data center VXLAN networks. The main application of EVPN is DCI, to provide the ability to extend Layer 2 connectivity between different data centers. Advantageously, this allows dynamic allocation of resources within or between data centers without being constrained by Layer 2 boundaries or being forced to create large or geographically stretched Layer 2 domains. EVPN AF uses the concept of RTs to establish sessions between the provider edge (PE) and the customer edge (CE). Of note, the PE and CE are at associated routers, referred to as PE routers or devices, and CE routers or devices.

Here are descriptions of the possible RTs supported for EVPN AF.

Route Type 1 route, Ethernet auto discovery (AD) route—Type 1 routes are for networkwide messages. Ethernet auto discovery routes are advertised on a per end virtual identifier and per Ethernet segment identifier basis. The Ethernet auto discovery routes are required when a customer edge device is multihomed.

Route Type 2 route, MAC with IP advertisement route—Type 2 routes are per-VLAN routes, EVPN allows an end host's IP and MAC addresses to be advertised within the EVPN NLRI.

Route Type 3 route, inclusive multicast Ethernet tag route—Type 3 routes are per-VLAN routes. An inclusive multicast Ethernet tag route sets up a path for broadcast, unknown unicast, from a PE device to the remote PE device on a per-VLAN, per-EVI basis.

Route Type 4 route, Ethernet segment Route—An ESI allows a CE device to be multihomed to two or more PE devices—in single/active or active/active mode. PE devices that are connected to the same Ethernet segment discover each other through the ESI.

Route Type 5 route, IP prefix Route—An IP prefix route provides encoding for inter-subnet forwarding. In the control plane, EVPN RT 5 routes are used to advertise IP prefixes for inter-subnet connectivity across data centers. To reach a tenant using connectivity provided by the EVPN RT 5 IP prefix route, data packets are sent as Layer 2 Ethernet frames encapsulated in the VXLAN header over the IP network across the data centers.

Route Type 6 route, selective multicast Ethernet tag routes.

Route Type 7 route, NLRI to sync IGMP joins.

Route Type 8 route, NLRI to sync IGMP leaves.

When a BGP peer needs updated routes from a remote BGP peer, then an on demand configuration "soft reset peer <peer ip> afi < > safi < > soft inbound" can be issued for any peer per AF. For example, assume the router 14 needs updated routes from the router 12. The router 14 performs a soft reset for on demand configuration for EVPN AF from the router 12. This will generate an RR BGP message for that AF. When BGP peer, i.e., the router 12, receives the RR BGP message, then it will advertise all routes. For example, assume RT 1 to RT 5 are used, then the router 12 will advertise RT 1 to RT 5 routes upon receiving the RR BGP message. Also, when a routing policy is applied/modified, an RR BGP message is issued to get the routes again. This presents a scaling issue on both the routers 12, 14, namely either the transmitting or receiving BGP peer expends a significant amount of processor (CPU) usage can be for the RT exchange as well as flooding of information that may not be necessary.

VPN RT 5 are IP-L3VPN routes while RT 1 to 4 are L2VPN routes. Generally, different Routing policy rules are applied to these routes. Routing policy have to match route-type field to apply specific rules for specific route types. However, whenever routing policy changes, a route refresh will always get all EVPN routes (of all route types) even though changes are only applicable to a specific route type. Also, activation or deactivation of either IP-L3VPN route type or L2VPN route type, results in all EVPN route types getting advertised between the EVPN routers.

Where EVPN AF multiple RTs are supported, the BGP peer will advertise all type of routes when the RR BGP message is received. This creates unnecessary update messages for all RTs when a BGP peer only needs specific RT routes. Of note, route refresh is described in RFC 2918, "Route Refresh Capability for BGP-4," September 2000, the contents of which are incorporated by reference in their entirety. RFC 2918 describes the RR BGP message. There is no ability in RFC 2918 to get routes from remote peer based upon RT. That is, the RR BGP message in RFC 2918 causes the transmission and reception of all RTs.

Selective Route Refresh Based on RT Type

Variously, the present disclosure provides a selective RR BGP message, based on RFC 2918, with extensions to support designating which RTs should be refreshed. FIG. 2 is a diagram of a RR message 20 as defined in RFC 2918. The present disclosure can include a new sub type in the RR message 20 to get routes of specific RT only. In an embodiment, a new value in the reserved field 22 is assigned to indicate this RR message 20 is a new type for EVPN AF. Once this new value is set in reserved field 22, the RR message 20 payload will contain the EVPN Route Type information (Bitmask for each route type).

Assume the router 14 supports sending new type in the reserved field 22 to designate selective route refresh from the router 12. As such, when the router 12 does not support this enhanced functionality, the router 12 can ignore the reserved field 22 and refresh all RTs as per RFC 2918. When the router 12 supports this enhanced functionality, the router 12 can provide RTs based on what is specified in the reserved field 22. That is, non-zero values in the reserved field 22 are either ignored by the router 14 when this functionality is not supported or processed to selectively refresh based on RTs.

Those skilled in the art will recognize there can be different implementations for conveying which RTs are required, all of which are contemplated herewith. The following describe two non-limiting example implementations for illustration purposes.

In an embodiment, the EVPN RTs will be via a bitmask in the payload of the RR message. Again, those skilled in the art will recognize various implementations are possible and all are contemplated herewith.

BGP speakers can advertise and negotiate this new route refresh capability for support of this new Route Refresh message. Alternatively, BGP speakers can just use the reserved field 22 with this new route refresh capability, and non-supporting routers will not be negotiating this new RR capability.

In an embodiment, the reserved field 22 can include these values:
  0 is for Normal Route-Refresh
  1 is for BoRR (Demarcation of the beginning of a route refresh)
  2 is for EoRR (Demarcation of the ending of a route refresh)
  3 A new value in Res field will be assigned to this new type for RR for EVPN Benefits This new functionality solves the problem of unnecessary updated message of all RTs when RR is issued with EVPN AF. BGP CPU usage can be controlled allowing scale in a network, without having to keep extending the processing capability of the routers 12, 14. Selective EVPN route type advertisement requests through the new RR message will result in lesser network and CPU churn on both receiver and transmitter of EVPN routes.

Use Cases

New RTs are added occasionally, so there is a need to scale the route refresh capability. That is, every RR does not necessarily need all supported RTs. For example, if the router 14 only needs RT 5 refreshed, the conventional approach requires the router 12 to send everything, i.e., RT 1 to RT 5. There can be millions of routes and significant processing to send and receive the information. The foregoing techniques eliminate this and allow the router 12 to only refresh RT 5.

There can be various use cases, two of which are described below for illustration purposes. In a first use case, there is a change in routing policy at Layer 2 or Layer 3, and there may only be a need for the corresponding RTs that are changed. In a second use case, assume the routers 12, 14 only support a L2VPN running with RT 1 to RT 4, and there is a desire to upgrade to include a L3VPN. Now, there is only a need for RT 5, i.e., no need to resend RT 1 to RT 4.

VPN RT5 is IP-L3VPN routes while RT1-4 are L2VPN routes. Generally different Routing policy rules are applied to these routes. Routing policy have match route-type field to apply specific rules for specific route types. But whenever routing policy changes, route refresh will always get all EVPN routes (of all route-types) even though changes are only applicable to specific route-type. Thus, conventionally, Activation or Deactivation of either IP-L3VPN route type or L2VPN route type, results in all EVPN route types getting advertised between the EVPN routers. The present disclosure enables selective advertisements.

Process

Figure 3:
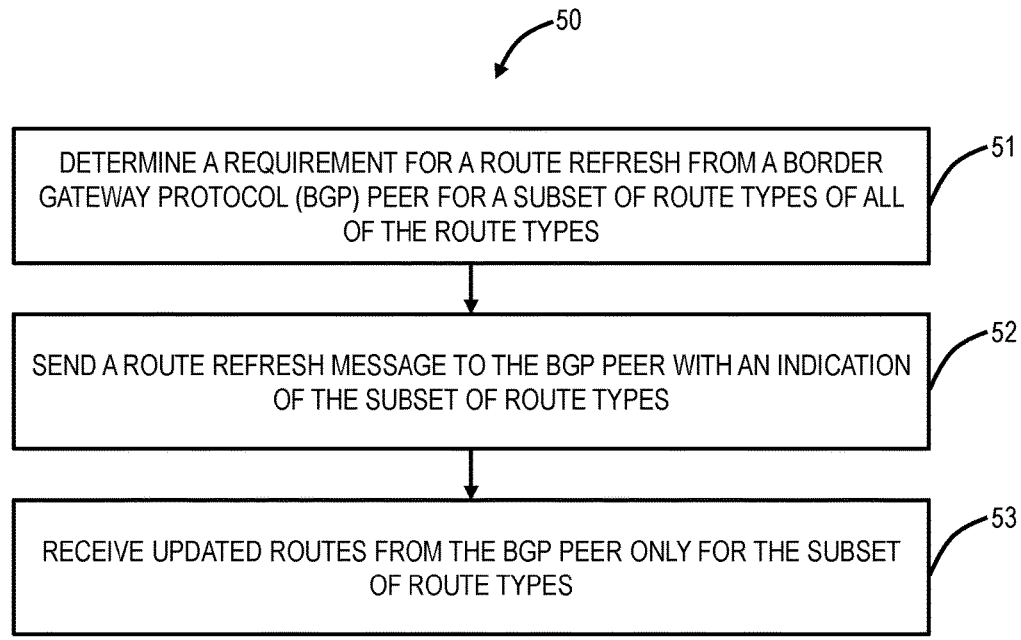
FIGS. 3 and 4 are flowcharts of a receiving process (FIG. 3) and a sending process (FIG. 4) for advertisement of selective Ethernet Virtual Private Network (VPN) (EVPN) routes based on route types.
Figure 4:
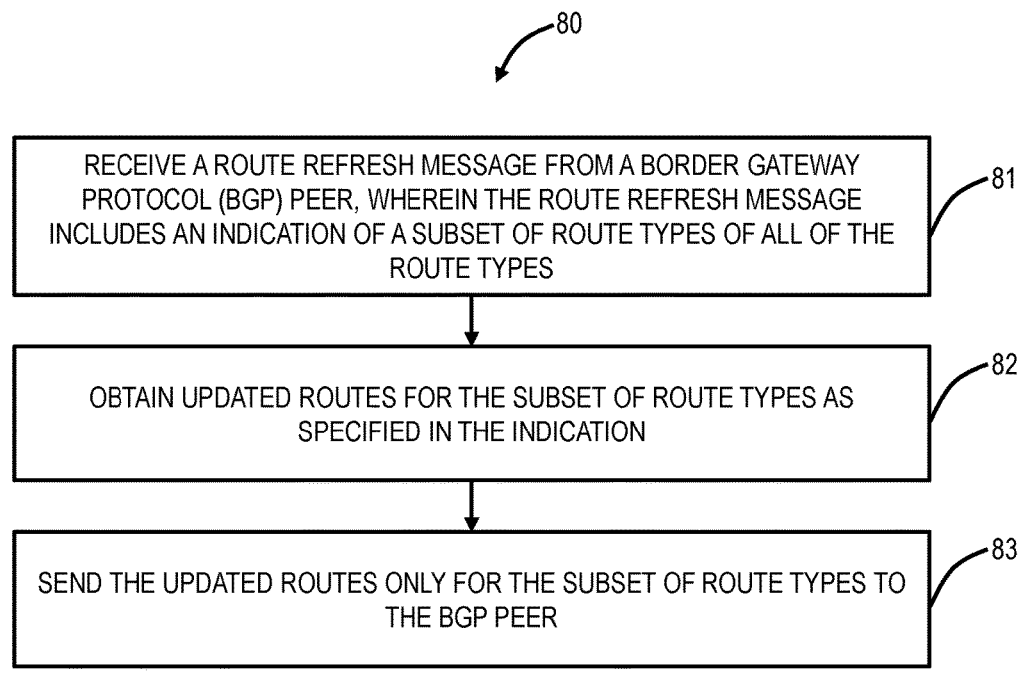

FIGS. 3 and 4 are flowcharts of a receiving process 50 (FIG. 3) and a sending process 80 (FIG. 4) for advertisement of selective Ethernet Virtual Private Network (VPN) (EVPN) routes based on route types. The processes 50, 80 contemplate implementation as a method having steps, via the routers 12, 14 configured to implement the steps, and as a non-transitory computer-readable medium having instructions that, when executed, cause a processor or other circuitry to execute the steps.

The receiving process 50 includes determining a requirement for a route refresh from a Border Gateway Protocol (BGP) peer for a subset of Route Types of all of the Route Types (step 51), sending a route refresh message to the BGP peer with an indication of the subset of Route Types (step 52), and receiving updated routes from the BGP peer only for the subset of Route Types (step 53). The process 50 can also include determining a second requirement for a route refresh from the BGP peer or another BGP peer for all of the Route Types, sending a second route refresh message to the BGP peer without the indication of the subset of Route Types, and receiving second updated routes from the BGP peer only for all of the Route Types.

The indication can be included in a reserved field and/or payload of the route refresh message. Responsive to the BGP peer not supporting the indication of the subset of Route Types, the BGP peer negotiates that the received updated routes are for the all of Route Types. In an embodiment, bits in the reserved field can be used to designate one or more Route Types for the subset of Route Types based on the indication in the reserved field. In another embodiment, a value of the reserved field or the payload can be used to designate the for the subset of Route Types. The route refresh message can be defined in RFC 2918. The subset of Route Types can include one of Route Types 1 to 4 or Route Type 5. The process 50 can further include, prior to the route refresh message being sent, negotiating with the BGP peer to support the route refresh message with the indication of the subset of Route Types.

The process 80 includes receiving a route refresh message from a Border Gateway Protocol (BGP) peer, wherein the route refresh message includes an indication of a subset of Route Types of all of the Route Types (step 81), obtaining updated routes for the subset of Route Types as specified in the indication (step 82), and sending the updated routes only for the subset of Route Types to the BGP peer (step 83).

The indication can be included in a reserved field and/or payload of the route refresh message. In another embodiment, a value in the payload can be used to designate the for the subset of Route Types based on the indication in the reserved field. The route refresh message can be defined in RFC 2918. The subset of Route Types can include one of Route Types 1 to 4 or Route Type 5. The process 80 can further include, prior to the route refresh message being received, negotiating with the BGP peer to support the route refresh message with the indication of the subset of Route Types.

Example Node

Figure 5:
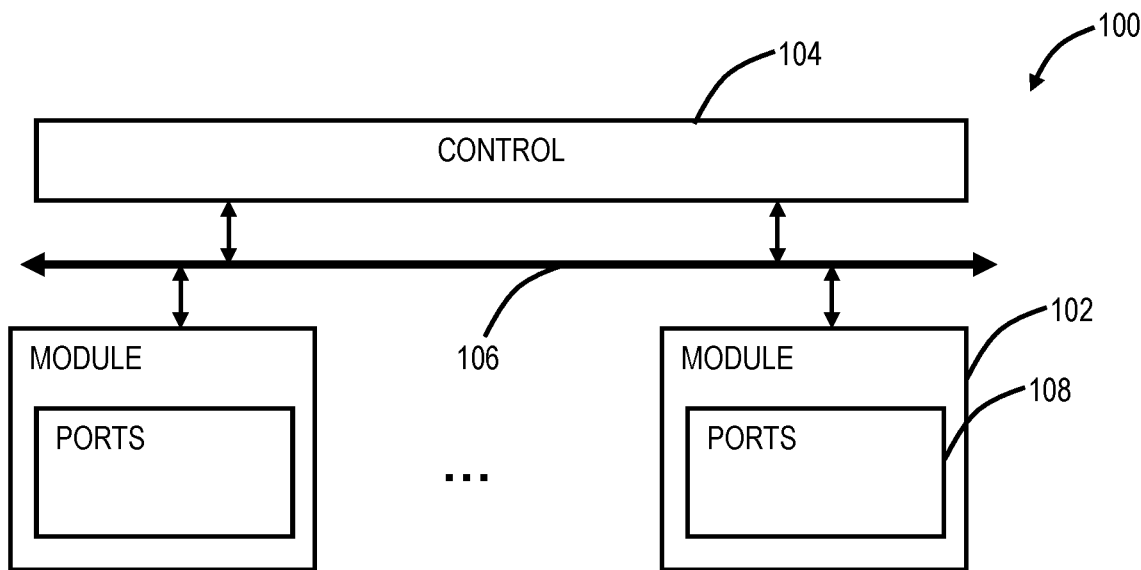
FIG. 5 is a block diagram of an example implementation of a router, such as forming any of the routers described herein.

FIG. 5 is a block diagram of an example implementation of a router 100, such as forming any of the routers described herein. Those of ordinary skill in the art will recognize FIG. 5 is a functional diagram in an oversimplified manner, and a practical embodiment may include additional components and suitably configured processing logic to support known or conventional operating features that are not described in detail herein.

In an embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 5 is meant to provide a functional view, and those of ordinary skill in the art will recognize actual hardware implementations may vary; all of which are contemplated herewith.

Example Processing Device

Figure 6:
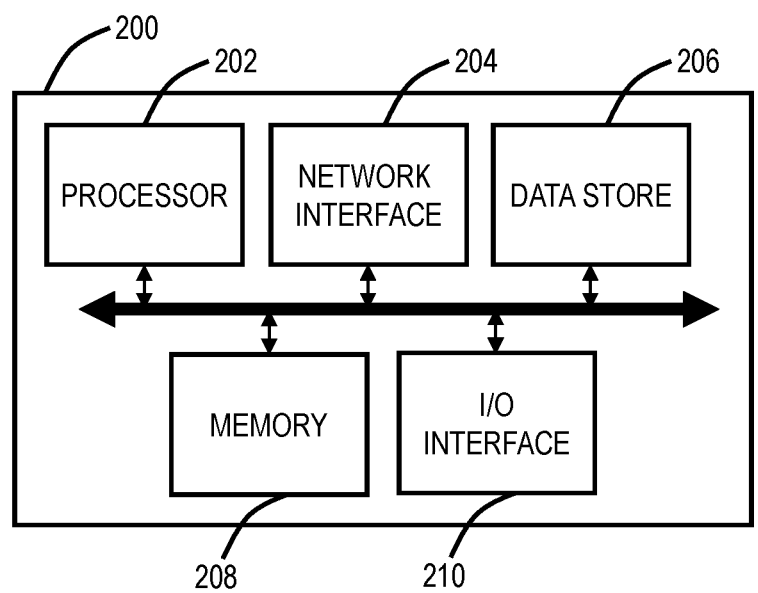
FIG. 6 is a block diagram of an example processing device.

FIG. 6 is a block diagram of an example processing device 200. The processing device 200 can be part of the router 100, or a stand-alone device communicatively coupled to the router 100, such as a management system, controller, etc. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A router configured to send an advertisement of selective Ethernet Virtual Private Network (VPN) (EVPN) routes based on Route Types, the router comprising circuitry configured to:

determine a requirement for a route refresh from a Border Gateway Protocol (BGP) peer for a subset of Route Types of all of the Route Types, wherein the Route Types include any of Route Types 1 to 8 including RT-1—Ethernet Auto-Discovery (A-D) route, RT-2—MAC/IP Advertisement route, RT-3—Inclusive Multicast Ethernet Tag route, RT-4—Ethernet Segment route, RT-5—IP prefix route, RT-6—selective Multicast Ethernet Tag route, RT-7—NLRI to sync IGMP joins, and RT-8—NLRI to sync IGMP leaves, negotiate with the BGP peer to support the route refresh message with the indication of the subset of Route Types, using a bitmask for each Route Type 1 to 8, send a route refresh message to the BGP peer with an indication of the subset of Route Types, based on the negotiated support, and receive updated routes from the BGP peer only for the subset of Route Types.

2. The router of claim 1, wherein the circuitry is further configured to determine a second requirement for a route refresh from the BGP for all of the Route Types, send a second route refresh message to the BGP peer without any indication of any of the Route Types, where the second route refresh message is defined in RFC 2918, and receive second updated routes from the BGP peer for all of the Route Types.

3. The router of claim 1, wherein the indication is included in one or more of a reserved field and payload of the route refresh message.

4. The router of claim 3, wherein, responsive to the BGP peer not supporting the indication of the subset of Route Types, the circuitry is further configured to negotiate the received updated routes are for all of the Route Types.

5. The router of claim 3, wherein bits in the payload are used to designate one or more Route Types for the subset of Route Types based on the reserved field, using a bitmask for each Route Type 1 to 8.

6. The router of claim 3, wherein a value in the payload is used to designate one or more Route Types for the subset of Route Types.

7. The router of claim 3, wherein the route refresh message is defined in RFC 2918.

8. The router of claim 1, wherein the subset of Route Types includes one of Route Types 1 to 4 or Route Type 5.

9. A non-transitory computer-readable medium comprising instructions that, when executed, cause circuitry associated with a router to perform steps of:

determining a requirement for a route refresh from a Border Gateway Protocol (BGP) peer for a subset of Route Types of all of the Route Types, wherein the Route Types include any of Route Types 1 to 8 including RT-1—Ethernet Auto-Discovery (A-D) route, RT-2—MAC/IP Advertisement route, RT-3—Inclusive Multicast Ethernet Tag route, RT-4—Ethernet Segment route, RT-5—IP prefix route, RT-6—selective Multicast Ethernet Tag route, RT-7—NLRI to sync IGMP joins, and RT-8—NLRI to sync IGMP leaves;

negotiating with the BGP peer to support the route refresh message with the indication of the subset of Route Types, using a bitmask for each Route Type 1 to 8;

sending a route refresh message to the BGP peer with an indication of the subset of Route Types based on the negotiating; and receive updated routes from the BGP peer only for the subset of Route Types.

10. The non-transitory computer-readable medium of claim 9, wherein the indication is included in one or more of a reserved field and payload of the route refresh message.

11. The non-transitory computer-readable medium of claim 9, wherein the subset of Route Types includes one of Route Types 1 to 4 or Route Type 5.

12. A router configured to receive selective Ethernet Virtual Private Network (VPN) (EVPN) routes based on Route Types, the router comprising circuitry configured to:

receive a route refresh message from a Border Gateway Protocol (BGP) peer, wherein the route refresh message includes an indication of a subset of Route Types of all of the Route Types, wherein the Route Types include any of Route Types 1 to 8 including RT-1—Ethernet Auto-Discovery (A-D) route, RT-2—MAC/IP Advertisement route, RT-3—Inclusive Multicast Ethernet Tag route, RT-4—Ethernet Segment route, RT-5—IP prefix route, RT-6—selective Multicast Ethernet Tag route, RT-7—NLRI to sync IGMP joins, and RT-8—NLRI to sync IGMP leaves, obtain updated routes for the subset of Route Types as specified in the indication, and send the updated routes only for the subset of Route Types to the BGP peer, wherein the indication is included in one or more of a reserved field and payload of the route refresh message, using a bitmask for each Route Type 1 to 8.

13. The router of claim 12, wherein bits in the payload are used to designate one or more Route Types for the subset of Route Types based on the reserved field, using a bitmask for each Route Type 1 to 8.

14. The router of claim 12, wherein a value in the payload is used to designate one or more Route Types for the subset of Route Types.

15. The router of claim 12, wherein the route refresh message is defined in RFC 2918.

16. The router of claim 12, wherein the subset of Route Types includes one of Route Types 1 to 4 or Route Type 5.

17. The router of claim 12, wherein the circuitry is further configured to prior to the route refresh message being received, negotiate with the BGP peer to support the route refresh message with the indication of the subset of Route Types, using a bitmask for each Route Type 1 to 8.

* * * * *